(12) United States Patent
Cox et al.

(10) Patent No.: US 11,174,710 B2
(45) Date of Patent: Nov. 16, 2021

(54) SYSTEM AND METHODOLOGY FOR JOINING COMPONENTS

(71) Applicant: SCHLUMBERGER TECHNOLOGY CORPORATION, Sugar Land, TX (US)

(72) Inventors: Chase Cox, Radford, VA (US); Ashutosh Dikshit, Lekki-Lagos (NG)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 212 days.

(21) Appl. No.: 15/767,332

(22) PCT Filed: Oct. 7, 2016

(86) PCT No.: PCT/US2016/055867
§ 371 (c)(1),
(2) Date: Apr. 10, 2018

(87) PCT Pub. No.: WO2017/066080
PCT Pub. Date: Apr. 20, 2017

(65) Prior Publication Data
US 2019/0234186 A1 Aug. 1, 2019

Related U.S. Application Data

(60) Provisional application No. 62/240,469, filed on Oct. 12, 2015.

(51) Int. Cl.
*E21B 43/08* (2006.01)
*B23K 20/22* (2006.01)
(Continued)

(52) U.S. Cl.
CPC .......... *E21B 43/08* (2013.01); *B23K 20/122* (2013.01); *B23K 20/1225* (2013.01);
(Continued)

(58) Field of Classification Search
CPC .................................. E21B 17/02; E21B 43/08
See application file for complete search history.

(56) References Cited

U.S. PATENT DOCUMENTS 2,128,111 A * 8/1938 Woods .................... E21B 17/04
285/45
2003/0056959 A1 3/2003 Castano-Mears et al.
(Continued)

FOREIGN PATENT DOCUMENTS

WO  WO2009009358 A1  1/2009

OTHER PUBLICATIONS

International Search Report and Written Opinion for corresponding PCT Application Serial No. PCT/US2016/055867, dated Dec. 29, 2016, 14 pages.

*Primary Examiner* — Tara Schimpf
(74) *Attorney, Agent, or Firm* — Matthew Goode

(57) ABSTRACT

A technique facilitates joining of components without subsequent heat treatments. The components are joined by using a friction stir process which establishes a desired friction stir region at an appropriate location to securely join the desired components. In well applications, various components of sand screen assemblies may be joined by the friction stir process. For example, metal sand screen components may be securely coupled with a corresponding metal base pipe. The joining technique enables retention of the corrosion resistant properties of the materials without applying post weld heat treatments and/or other subsequent treatments.

18 Claims, 4 Drawing Sheets

(51) Int. Cl.
  *B23K 20/12*    (2006.01)
  *E21B 17/02*    (2006.01)
  *B23K 101/06*       (2006.01)
  *B23K 103/18*       (2006.01)

(52) U.S. Cl.
  CPC .............. *B23K 20/22* (2013.01); *E21B 17/02* (2013.01); *B23K 2101/06* (2018.08); *B23K 2103/18* (2018.08)

(56) References Cited

U.S. PATENT DOCUMENTS

| | | |
|---|---|---|
| 2011/0240372 A1 | 10/2011 | Davis |
| 2012/0073801 A1 | 3/2012 | Greci et al. |
| 2012/0273555 A1* | 11/2012 | Flak .................. B23K 20/1225 228/112.1 |
| 2016/0281476 A1* | 9/2016 | Sladic .................. E21B 43/084 |
| 2017/0216961 A1* | 8/2017 | Utter ..................... F16B 5/08 |

\* cited by examiner

SYSTEM AND METHODOLOGY FOR JOINING COMPONENTS

CROSS-REFERENCE TO RELATED APPLICATION

The present document is based on and claims priority to U.S. Provisional Application Ser. No. 62/240,469, filed Oct. 12, 2015, which is incorporated herein by reference in its entirety.

BACKGROUND

Hydrocarbon fluids such as oil and natural gas are obtained from a subterranean geologic formation, referred to as a reservoir, by drilling a wellbore that penetrates the hydrocarbon-bearing formation. Once a wellbore is drilled, sand screen assemblies and other completion equipment may be deployed downhole in the wellbore. Current manufacturing methods for sand screens use fusion welding to join screen components to a base pipe. Because the downhole environment can be corrosive, sand screens often utilize corrosion resistant base pipe materials. However, fusion welding adversely affects such materials by, for example, increasing hardness in the vicinity of the weld zone and detrimentally affecting the corrosion resistance. Post weld heat treatments have been used to reduce the hardness and to at least partially restore the corrosion resistant properties of the base pipe. The post weld heat treatments increase the difficulty of manufacturing sand screen assemblies while also adding time and costs to the manufacturing process.

SUMMARY

In general, a methodology and system are provided to facilitate joining of components without subsequent heat treatments. The components are joined by using a friction stir process which establishes a desired friction stir region at an appropriate location to securely join the desired components. In well applications, various components of sand screen assemblies may be joined by the friction stir process. For example, metal sand screen components may be securely coupled with a corresponding metal base pipe. The joining technique enables retention of the corrosion resistant properties of the materials without applying post weld heat treatments and/or other subsequent treatments.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
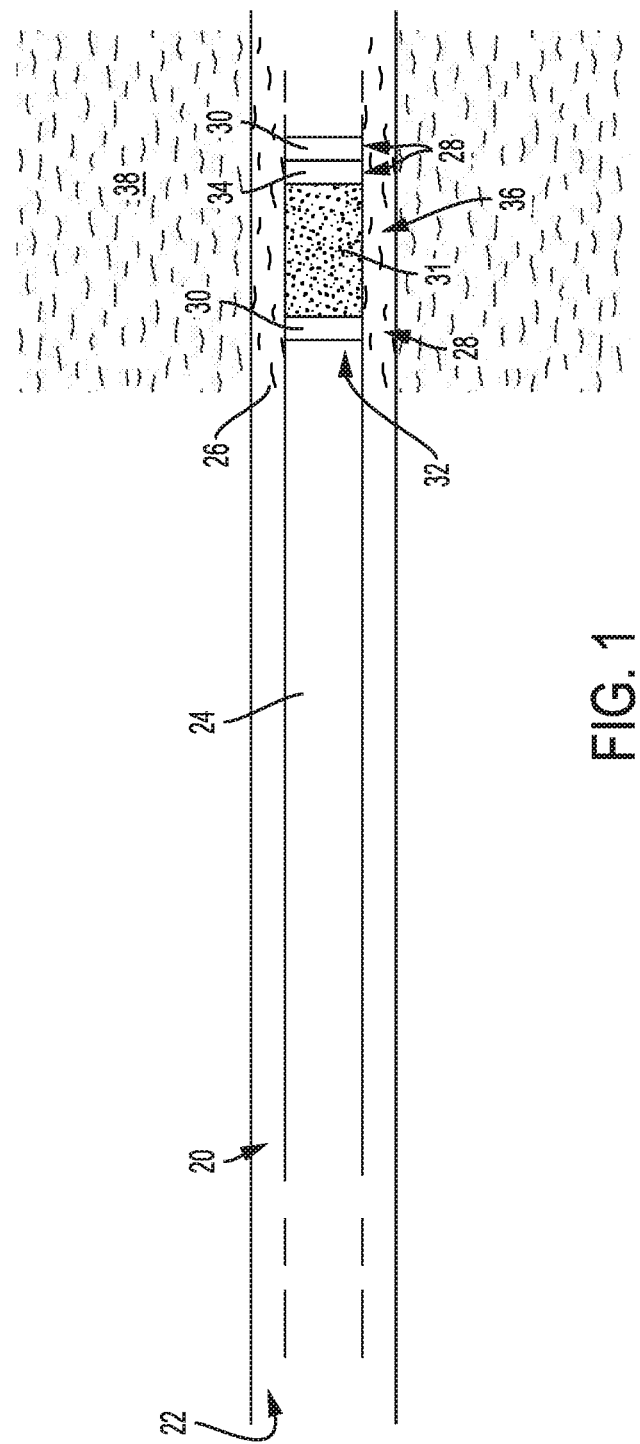
FIG. 1 is a schematic illustration of an example of a well system comprising a well string with a screen assembly deployed in a wellbore, according to an embodiment of the disclosure.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The present disclosure generally relates to a methodology and system which facilitate joining of components, e.g. metal components, without subsequent heat treatments. The technique enables the rapid and efficient joining of components and may be readily used to join components constructed of dissimilar metals or similar metals. The components are joined by using a friction stir process which establishes a desired friction stir region at an appropriate location to securely join the desired components. In well applications, various components of sand screen assemblies may be joined by the friction stir process. For example, metal sand screen components may be securely coupled with a corresponding metal base pipe. The joining technique enables retention of the corrosion resistant properties of the materials without applying post weld heat treatments and/or other subsequent treatments. This, in turn, reduces the time and costs associated with manufacturing the sand screen assembly or other type of assembly.

A friction stir process is a solid state process utilizing a third body tool to join components. During the process, the metal is not melted, but heat is generated between the third body tool and the material against which the tool is acting to produce a soft region of material. The soft region may be used to, for example, deform one component until it is able to grippingly/frictionally engage the adjacent component. In some applications, however, the friction stir process may be used to intermix material from each component during the stirring so as to create a friction stir weld.

The intermixing of materials during the friction stir process is sometimes referred to as friction stir welding. As the third body tool is operated, e.g. rotated, to join adjacent components, heat is generated between the tool and the material, e.g. metal, against which it acts. Sufficient heat is generated to create a soft region of metal material which extends into each of the adjacent components. This soft region of metal enables the adjacent components to be joined by using mechanical pressure applied by the third body tool to force a mechanical intermixing of the similar or dissimilar metals of the adjacent components. The resulting friction stir weld securely joins the adjacent components and the intermixing of materials may be used to create a secure seal along the joined region. Because the friction stir joining process is at a substantially lower temperature than conventional forms of welding, the corrosion resistant properties of the metal components are retained without applying conventional post weld heat treatments.

The reduction or elimination of post weld heat treatments facilitates or efficient construction of a variety of assemblies. In well applications, for example, sand screen assemblies may be assembled by employing friction stir processes.

Because the friction stir process, e.g. friction stir welding, is a solid state process, the temperatures within the screen assembly weld zones are substantially lower than temperatures resulting from fusion welding and other forms of welding traditionally used to attach sand screen assembly components. The lower temperatures associated with the friction stir process do not adversely affect the hardness of the region being joined, e.g. the weld zone. Depending on the application, the weld geometry can be adjusted to accommodate stir welding. For example, a lapped friction stir weld may be used in lieu of a lapped fillet arc weld.

Referring generally to FIG. 1, an embodiment of a well system 20 is illustrated as conveyed downhole into a wellbore 22. In this example, the well system 20 comprises a well string 24 having a sand screen assembly 26 with various components 28 joined by a friction stir process. By way of example, the components 28 may comprise attachment rings 30 by which a filter medium 31 is affixed around a base pipe 32. For example, two attachment rings 30 may be used and positioned on opposite longitudinal ends of the filter medium 31. The components 28 also may comprise various types of end rings and centralizer rings as well as threaded base pipe ends. Additionally, the components 28 may comprise portions of an alternate path system or an inflow control device 34 which are coupled to the base pipe 32 and/or to other components of the sand screen assembly. Depending on the application, several types of components 28 may be coupled to the base pipe 32 and/or to other sand screen assembly components by a friction stir process, such as friction stir welding.

In many applications, a gravel pack 36 may be formed along the annulus surrounding the sand screen assembly 26. By way of example, the gravel pack 36 may be formed by delivering a gravel slurry down through an interior of well string 24 and circulating the gravel slurry out into the surrounding annulus. The gravel pack 36 works in cooperation with sand screen assembly 26 to filter particulates from well fluid which flows into wellbore 22 from a surrounding formation 38.

Figure 2:
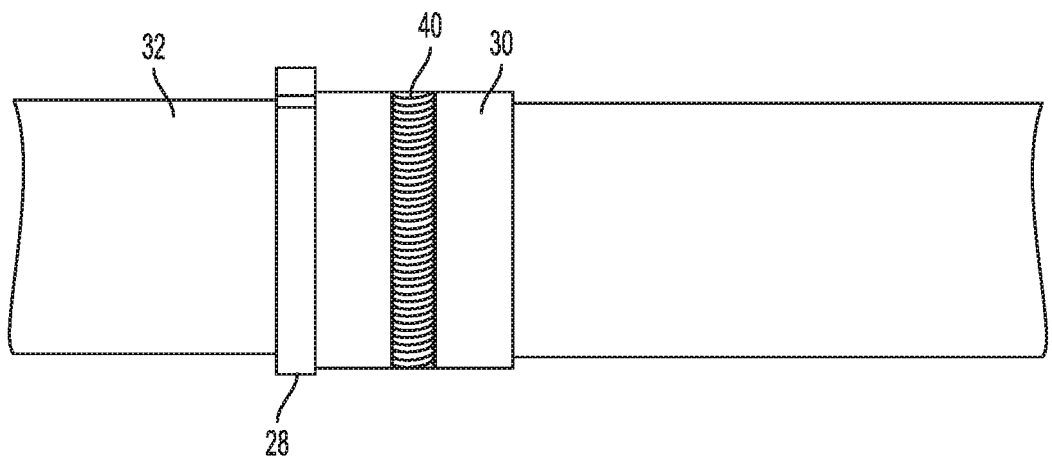
FIG. 2 is an illustration of a sand screen component attached to a base pipe via a friction stir region, according to an embodiment of the disclosure.

Referring generally to FIG. 2, an application of a friction stir process is illustrated. The friction stir process is used to create a friction stir region 40 which secures adjacent components to each other. By way of example, one of the components 28 may be secured to base pipe 32. In a variety of applications, the friction stir process can be used to create the friction stir region 40 in a manner forming a seal between the components. According to an embodiment, the friction stir process may effectively deform the illustrated component 28 so as to frictionally/grippingly engage the base pipe 32 (or other adjacent component). In some applications, the friction stir process is a friction stir welding process in which a metal material of the component 28 is intermixed with a metal material of base pipe 32 (or other adjacent component). In this latter example, the friction stir region 40 is in the form of a friction stir weld. These methodologies may be used to form a seal between components, e.g. between components 28 and 32.

Referring again to FIG. 2, the component 28 may be in the form of at least one attachment ring 30. The attachment ring 30 may be used to secure a variety of components to base pipe 32 via the friction stir process to reduce or eliminate post weld heat treatments. By way of example, the attachment ring or rings 30 may be in the form of centralizer rings or end rings used to secure the filter medium 31 around base pipe 32. The filter medium 31 filters particulates from the inflowing fluid before the inflowing fluid passes to the interior of the base pipe 32 via perforations and/or inflow control device 34. In some applications, the attachment ring 30 is formed of the same or similar metal material as the metal material used to construct base pipe 32. However, the attachment ring 30 also may be formed of a dissimilar metal material relative to that of base pipe 32. In either case, the friction stir process, e.g. friction stir welding, may be used to create friction stir region 40 and to efficiently join the components, e.g. components 28 and 32.

Figure 3:
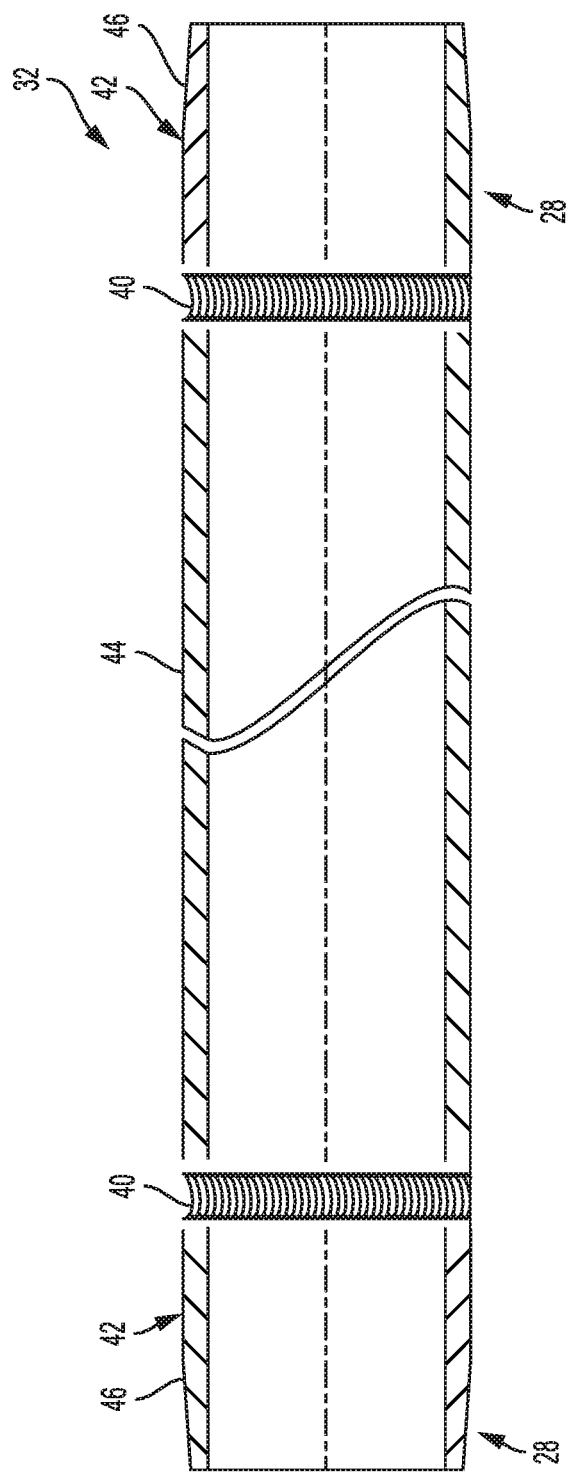
FIG. 3 is an illustration of threaded base pipe joint ends attached to a portion of a base pipe via friction stir regions, according to an embodiment of the disclosure.

In FIG. 3, another embodiment is illustrated as utilizing friction stir regions 40 to join components. In this example, components 28 comprise base pipe ends 42 joined to a central base pipe portion 44 of base pipe 32. By way of example, the base pipe ends 42 may be in the form of threaded ends each having a threaded region 46. In this manner, threaded base pipe joints may be constructed for coupling with other base pipe joints and/or other components of well string 24. The threaded base pipe ends 42 may be in the form of externally threaded pin ends or internally threaded box ends.

As illustrated, the threaded base pipe ends 42 are connected and sealed with respect to central base pipe portion 44 via a friction stir welding process which creates friction stir regions 40. By building the sand screen assembly 26 using plain ended pipe for central base pipe portion 44 and then friction stir welding the desired threaded base pipe ends 42 to central portion 44, different types of ends and different types of threads are readily integrated into the base pipe 32. Sometimes different types of well strings 24 utilize different thread types, and this approach of using friction stir welding to attach desired threaded base pipe ends 42 improves the flexibility of the construction process while reducing lead time.

For example, the ability to friction stir weld the threaded base pipe ends 42 to central base pipe portion 44 decouples the lead time otherwise associated with threading the component and manufacturing the sand screen assembly. By simply attaching the base pipe ends 42 via friction stir welding, both processes can be run concurrently and the lead time is substantially reduced. Furthermore, this process enables use of many configurations of pre-manufactured plain ended central base pipe portion 44 for combination with various threaded ends 42 because the threaded base pipe ends 42 can be welded at a final stage without post weld heat treatments. Also, the base pipe ends 42 and the central base pipe portion 44 may be constructed from similar metal materials or dissimilar metal materials.

Use of friction stir welding to attach ends 42 to central base pipe portion 44 via friction stir regions 40 further enables use of non-timed threads even when the base pipe 32 is to be coupled with other components in a timed relationship. For example, threaded base pipe ends 42 may be formed with non-timed threads and then friction stir welded to central base pipe portion 44 along a timed line. In other words, each base pipe end 42 may be oriented to provide a desired timing, and hence function like a timed thread, simply by friction stir welding each base pipe end 42 to the central portion 44 in a desired rotational orientation. Accordingly, the threaded regions 46 of base pipe ends 42 may be formed as non-timed threads and then the base pipe ends 42 may be attached at a desired angular orientation with respect to central base pipe portion 44 to effectively provide the desired timing.

Figure 4:
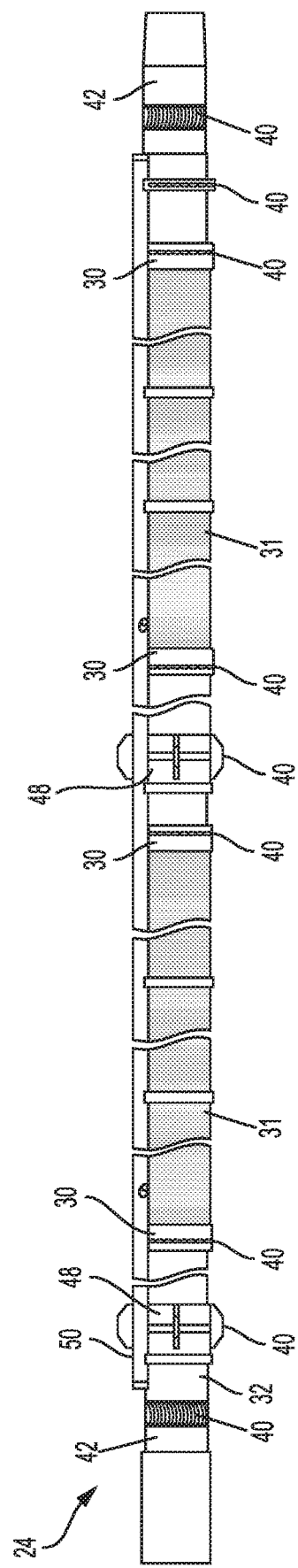
FIG. 4 is an illustration of a sand screen assembly having a plurality of filters connected to attachment rings which, in turn, are coupled with a corresponding base pipe via friction stir regions, according to an embodiment of the disclosure.

Referring generally to FIG. 4, an embodiment of well string 24 is illustrated. In this example, the illustrated portion of well string 24 comprises a plurality of sand screen assemblies 26. Each sand screen assembly 26 utilizes a plurality of friction stir regions 40 formed by a friction stir process. Examples of the friction stir process include friction stir welding and the use of friction stirring to deform one component 28 into friction engagement, e.g. gripping engagement, with an adjacent component 28/32.

In the embodiment of FIG. 4, friction stir regions 40 have been created via the appropriate friction stir process to enable efficient attachment of base pipe ends 42, e.g. box or pin ends. As described above, the friction stir welding process can be used to establish timed connections with base pipe ends 42 having untimed threaded regions 46. The friction stir welding process enables both use of many types of threads or combinations of threads along either box or pin ends 42 and use of base pipe ends 42 having different metallurgy relative to the central portion 44.

The friction stir regions 40 also may be created via the appropriate friction stir process to facilitate attachment of a variety of sand screen accessories 48 while preserving corrosion resistance or other metallurgical properties with limited or no post weld heat treatments. Examples of sand screen accessories 48 comprise premium ports, centralizers, stop rings, and/or alternate path systems such as the illustrated alternate path system 50. The friction stir process also enables efficient attachment of desired sections of the filter medium 31 via, for example, attachment rings 30 as discussed above. In some applications, the friction stir process may be used to create a sand control surface between the sand screen, e.g., the filter medium 31, and the base pipe 32.

In many applications, the friction stir process provides an efficient method of attachment. For example, the friction stir process enables friction stir welding attachment or friction attachment without post weld heat treatments. The friction stir welding intermixes the metal materials and thus can be used to form a seal between the components. In some applications, the friction stir process can be used to deform one component sufficiently against the other so as to also form a seal therebetween. In sand control applications, many components of the sand screen assembly 26 may thus be assembled more rapidly via the friction stir processes.

Depending on the application, the friction stir process may be used to form many types of friction stir regions 40. Various friction stir welding or friction stir deformation processes may be used to join many types of metal components. The lower temperatures of the solid-state joining process enables retention of the desired metallurgical properties of joined components without additional processing, thus substantially shortening the construction time.

The friction stir processes described herein may be used with many types of sand screen assemblies 26. In some applications, the friction stir processes also may be used to couple components at other locations along the well string 24. Depending on the types of components being joined, the depth, width, and/or length of the friction stir region 40 may be adjusted to provide the desired joining of components. In sand screen assemblies, the stir processes can be used to join several types of components 28 to base pipe 32. However, the processes also may be used to join other components of the sand screen assembly 26.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system for filtering, comprising:
   a sand screen assembly having:
   a base pipe;
   a filter medium positioned around the base pipe; and
   a plurality of attachment rings coupled to the filter medium, each attachment ring being connected to the base pipe by a first friction stir region to secure the filter medium with respect to the base pipe,
   wherein the base pipe comprises: a central base pipe portion; and a pair of threaded base pipe ends formed with non-timed threads, and joined to the central base pipe portion at a predetermined angular orientation via second and third friction stir regions to establish timed connections.

2. The system as recited in claim 1, wherein the first friction stir region forms a seal between the attachment ring and the base pipe.

3. The system as recited in claim 1, wherein the first friction stir region establishes a friction stir weld which mixes metal materials from the attachment ring and the base pipe.

4. The system as recited in claim 1, wherein the first friction stir region is formed in the attachment ring at a location which causes the attachment ring to grippingly engage the base pipe.

5. The system as recited in claim 1, wherein the plurality of attachment rings comprises two attachment rings with each attachment ring positioned on an opposite longitudinal end of the filter medium from the other.

6. The system as recited in claim 1, wherein the first friction stir region comprises a mixing of dissimilar metals.

7. The system as recited in claim 1, wherein the first friction stir region comprises a mixing of similar metals.

8. A method, comprising:
   assembling a sand screen assembly; and
   using a friction stir process to join selected components of the sand screen assembly,
   wherein using comprises using the friction stir process to attach a threaded base pipe end formed with non-timed threads to a portion of a base pipe at a predetermined angular rotation to establish a timed connection.

9. The method as recited in claim 8, further comprising coupling the sand screen assembly into a well string and conveying the sand screen assembly downhole into a wellbore.

10. The method as recited in claim 8, wherein using further comprises using the friction stir process to mechanically mix metal material between components being joined.

11. The method as recited in claim 8, wherein assembling comprises coupling a filter medium with an attachment ring, and wherein using further comprises using the friction stir process to join the attachment ring to a base pipe.

12. The method as recited in claim 8, wherein using further comprises using the friction stir process to attach an inflow control device to a base pipe.

13. The method as recited in claim 8, wherein using further comprises using the friction stir process to attach an alternate path component to a base pipe.

14. The method as recited in claim 8, wherein using further comprises using the friction stir process to create a seal between components.

15. A system, comprising:
    a well string having a plurality of sand screen assemblies, each sand screen assembly comprising a base pipe and a plurality of screen components mounted to the base pipe, at least one screen component being coupled to the base pipe via solid-state mixing of metal material from the at least one screen component and from the base pipe to establish a first friction stir region, wherein the at least one screen component comprises a pair of threaded base pipe ends formed with non-timed threads, and joined to a portion of the base pipe at a predetermined angular rotation via a second friction stir region to establish timed connections.

16. The system as recited in claim 15, wherein the metal material from the at least one screen component is a different metal material than the metal material of the base pipe.

17. The system as recited in claim 15, wherein the at least one screen component comprises a plurality of attachment rings by which a filter medium is mounted about the base pipe.

18. The system as recited in claim 15, wherein the first friction stir region forms a seal between the at least one screen component and the base pipe.

* * * * *